United States Patent [19]

Petry

[11] 4,442,568
[45] Apr. 17, 1984

[54] DEVICE FOR SIMULTANEOUSLY DESHIRRING, SMOOTHING AND BRAKING A SHIRRED TUBULAR CASING

[75] Inventor: Rudolf Petry, Wiesbaden, Fed. Rep. of Germany

[73] Assignee: Hoechst Aktiengesellschaft, Frankfort am Main, Fed. Rep. of Germany

[21] Appl. No.: 387,370

[22] Filed: Jun. 11, 1982

[30] Foreign Application Priority Data

Jun. 19, 1981 [DE] Fed. Rep. of Germany ....... 3124025

[51] Int. Cl.³ ............................................ A22C 11/00
[52] U.S. Cl. ............................................ 17/33; 17/35; 53/576
[58] Field of Search ................... 17/41, 42, 49, 33, 34, 17/35, 1 R; 138/118.1; 53/576

[56] References Cited

U.S. PATENT DOCUMENTS

| 3,457,588 | 4/1969 | Myles et al. | 17/41 |
| 3,975,795 | 8/1976 | Kupcikevicius | 17/49 X |
| 4,077,090 | 3/1978 | Frey et al. | 17/41 |
| 4,202,075 | 5/1980 | Michel et al. | 17/41 |
| 4,317,256 | 3/1982 | Senders | 17/41 X |
| 4,335,488 | 6/1982 | Becker | 17/33 X |

FOREIGN PATENT DOCUMENTS 1177029 8/1964 Fed. Rep. of Germany .
1186359 1/1965 Fed. Rep. of Germany .......... 17/41

Primary Examiner—Willie G. Abercrombie
Attorney, Agent, or Firm—Schwartz, Jeffery, Schwaab, Mack, Blumenthal & Koch

[57] ABSTRACT

A device comprising two coaxially superposed outer tubes, wherein the innermost, first outer tube is disposed on the stuffing horn of a stuffing device for stuffing tubular casings with a fluid mass such as a sausage mixture. One of the two outer tubes is longitudinally displaceable with respect to the other outer tube. Pivotable elements fastened by pivotable mountings to the second outer tube and by pivotable joints to a connecting arm serve to deshirr and smooth the initially shirred tubular casing. Further, the elements press the tubular casing against the inner surface of an annular stop cylinder and thereby retard the withdrawal of the tubular casing from the shirred portion. The inner diameter of the stop cylinder is preferably smaller than the outer diameter of the deshirred portion of the tubular casing. A system comprising the aforesaid device, a tubular casing, the stuffing horn of a stuffing device, tying or clip devices and a cutting device is also disclosed.

7 Claims, 3 Drawing Figures

DEVICE FOR SIMULTANEOUSLY DESHIRRING, SMOOTHING AND BRAKING A SHIRRED TUBULAR CASING

BACKGROUND OF THE INVENTION

The present invention relates to a device for deshirring or unfolding, smoothing and braking or restricting the movement of a shirred tubular casing during the filling of the casing with a fluid material such as a sausage mixture. The invention further relates to a system containing such a device.

It is known to use shirred tubular casings of synthetic, semi-synthetic or natural materials for packing food products, for example meat products in the form of sausages. These shirred casings, which are known in the trade as "sticks" or "hollow rods", are produced by gathering and longitudinally compressing long casings to approximately one to three percent of their original length. In order to fill the shirred casing with a sausage mixture or other food product, generally, one end of the shirred casing is first closed, and then the shirred casing is normally placed on the filling tube or stuffing horn of a sausage machine. A sausage mixture is then forced under pressure through the stuffing horn into the casing which is thereby continuously unfolded or deshirred. After a predetermined length of the casing has been filled, the filled casing is tied off and closed to form cylindrical sausages.

For various reasons, the diameter of the sausages which are produced should remain constant throughout their entire length. Optimum filling of the tubular casing can be assured only by a uniform diameter, the size of which is dependent upon the particular casing. If the casing is overstuffed, it may burst, whereas if the casing is insufficiently filled, it will have a wrinkled surface.

Various devices for stuffing shirred tubular casings with sausage mixtures have been proposed in which special arrangements for deshirring, smoothing and braking are provided to achieve the most uniform diameter possible for the filled casings.

Thus, it is conventional to dispose adjacent the outlet of the stuffing horn, a calibrating means, the periphery of which presses against the inside wall of the casing to be filled and expands the casing. The contact pressure between the calibrating means and the inside wall of the casing gives rise to frictional forces which brake or retard the motion of the casing (U.S. Pat. No. 2,871,508).

It is also known to package the shirred tubular casing together with a calibrating disk and to connect this assembly to the stuffing horn of a sausage machine prior to the filling operation. The calibrating disk is enclosed or surrounded by an unshirred portion of the casing, whereby the outer circumference of the calibrating disk should be larger than the internal circumference of the deshirred casing. During the filling operation, the casing is drawn over the calibrating disk and is thereby stretched and expanded (U.S. Pat. No. 4,077,090). The calibrating disk must be made of a rigid, inelastic material so that its diameter will not be altered by the contact pressure of the casing against the periphery of the calibrating disk. Braking of the casing as it is withdrawn from the shirred portion during the filling operation is effected by means of an auxiliary device having the form of a ring with an annular attachment disposed following the calibrating disk whereby the braking effect is controlled by the frictional forces produced between the tubular casing and the attachment.

These inelastic calibrating disks have the disadvantage that the variations in casing circumference which cannot be avoided during the manufacturing process, will prevent optimum filling of the casing from being achieved. If the diameter of the casing is too small, there is a danger that the casing may be damaged or torn by the calibrating disk. At the very least, an especially strong frictional force will arise between the casing and the calibrating disk so that the casing will be overfilled with sausage mixture and have a tendency to be unable to withstand the high pressures which arise during boiling of the sausage and to burst.

U.S. Pat. No. 4,202,075 discloses a calibrating means which is made of a flexible material and has a variable diameter. This device is also intended to stretch and expand the tubular casing prior to the casing being filled with a sausage mixture, while the device provides a controllable degree of expansion. Even with this device, however, strong frictional forces can occur between the tubular casing and the calibrating means. With this device, the braking of the tubular casing is effected by means of a braking element which is disposed following the calibrating device and which presses the tubular casing against the stuffing horn.

SUMMARY OF THE INVENTION

Accordingly, it is the object of the present invention to provide an improved device for deshirring, smoothing and braking a shirred tubular casing prior to stuffing the casing with a fluid mixture.

Another object of the present invention is to provide a device for deshirring, smoothing and braking a shirred tubular casing which can convert the casing from the shirred to the deshirred condition without defects or wrinkles.

It is also an object of the present invention to provide a device for simultaneously deshirring, smoothing and braking a casing which avoids the danger that the tubular casing may be damaged by the calibrating means or the braking means.

A further object of the invention is to provide a device with a braking means which facilitates a smooth, jerk-free withdrawal of the casing.

An additional object of the present invention is to provide a device for simultaneously deshirring, smoothing and braking a shirred tubular casing which reduces the danger of tearing the casing.

Yet another object of the present invention is to provide a system for stuffing a tubular casing with a fluid mass comprising a device meeting the foregoing objects.

These and other objects of the invention are achieved by providing a device for deshirring, smoothing and braking a shirred tubular casing during the stuffing of the tubular casing with a fluid mass which flows under pressure out of the stuffing horn of a stuffing machine into the tubular casing, said device comprising first and second outer tubes arranged coaxially over each other on the stuffing horn whereby the innermost, first outer tube surrounds the stuffing horn, one of said outer tubes being fixed in position and the other outer tube being longitudinally displaceable and lockable into position, said device further comprising elements which deshirr, smooth and brake the tubular casing during the stuffing operation comprising pivotable bodies with smooth surfaces which are pivotably fastened at one of their ends by pivotable mounts to the end of one of said outer tubes and further are pivotably attached by pivotable joints to a connecting arm which in turn is pivotably fastened to a supporting mount at the end of the other outer tube, and a fixed stop cylinder having a substantially annular cross-sectional configuration surrounding said elements and spaced therefrom.

The objects of the invention are also achieved by providing a system for deshirring, smoothing and braking a shirred tubular casing during the stuffing of the tubular casing with a fluid mass which flows under pressure out of the stuffing horn of a stuffing machine into the tubular casing, comprising a stuffing horn, a shirred tubular casing disposed on the outer surface of the stuffing horn, said tubular casing having a deshirred portion with a prescribed outer diameter, a first outer tube surrounding the outer surface of the stuffing horn and ending adjacent the stuffing horn outlet, a second outer tube disposed on the first outer tube, a plurality of elements for deshirring, smoothing and braking the movement of the tubular casing, one end of said elements being pivotably fastened to pivotable mounts on the end of one of said outer tubes which is adjacent the end of the other outer tube, said elements further being pivotably attached by pivotable joints to a connecting arm and said connecting arm being pivotably fastened to a supporting mount at the end of the other outer tube; said first and second outer tubes being longitudinally displaceable with respect to each other to pivot said elements toward or away from the stuffing horn; a fixed stop cylinder having a substantially annular cross-sectional configuration spaced from and coaxially surrounding said stuffing horn and said elements; the shirred portion of said tubular casing being disposed over said second outer tube and the unshirred portion of said tubular casing extending over said elements, whereby said elements may be caused to press the deshirred portion of the tubular casing with increased pressure against the cylindrical inner surface of the stop cylinder by displacing the second outer tube toward the stuffing horn outlet or by displacing the first outer tube in the direction opposite to the stuffing horn outlet.

To simplify the description, the following text will refer only to "smoothing elements" instead of to "deshirring, smoothing and braking elements". It should also be kept in mind, however, that the elements also exert a braking function as a result of the urging of the tubular casing against the stop cylinder.

Preferably, the maximum diameter of the tube as it slides over the elements which deshirr, smooth and brake it will be smaller than its exterior diameter in the unshirred state. This was entirely unexpected since up until now, the prevailing opinion was that a stretching and expansion of the tubular casing was always required for simultaneous deshirring and smoothing of the tubular casing. An annular hollow body, the maximum diameter of which is smaller than the inner diameter of the deshirred tubular casing, is described in U.S. Pat. No. 3,975,795. However, this known hollow body serves only to smooth the tubular casing while a ring disposed in front of the annular hollow body with the tubular casing drawn through its central opening is provided for deshirring.

Surprisingly, it has now been discovered that an expansion of the tubular casing during the deshirring, smoothing or braking is not necessary for satisfactory stuffing of the tubular casing and, generally, is not of particular advantage. Rather, it is perfectly sufficient, and even advantageous in case of tubes which vary in diameter, if for simultaneous deshirring, smoothing and braking the tubular casing is drawn over the exterior of the smoothing elements without any expansion of the tubular casing beyond its original diameter being required, whereby the maximum exterior diameter of the tubular casing preferably amounts to from 70 to 99 percent, particularly from 90 to 99 percent, of its exterior diameter in the unshirred state. This maximum diameter is determined by the aperture diameter of the stop cylinder which has a substantially annular cross-sectional configuration against the cylindrical internal surface of which the outside of the tubular casing is pressed by the smoothing elements. Further, the braking of the tubular casing is effected with a single device which simultaneously functions to deshirr and to smooth the tubular casing whereby a stretching or distortion of the tubular casing is avoided.

A substantial advantage of the device and of the system of the invention is that the tubular casing is pressed in an already deshirred and creaseless state from the inside against the stop cylinder which lies adjacent its outer surface. In this way, the braking effect is achieved with a stop cylinder adjusted to a fixed location by means of the adjustable pressure of the smoothing elements in the inside of the deshirred tubular casing. Variations in the pressure with which the smoothing elements press the tubular casing against the stop cylinder, and thus also variations in the braking force, can be controlled during the filling operation by longitudinal displacement of the first or second outer tube which causes the smoothing elements to swing either toward or away from the stop cylinder. With an increase in the braking effect, the rate of withdrawal of the tubular casing during the filling operation is retarded, and the stuffed diameter of the filled tubular casing is thus increased.

BRIEF DESCRIPTION OF THE DRAWINGS

Further details of the invention will be described with reference to the accompanying drawings, wherein.

Throughout the drawings, like reference numerals have been used to designate like parts.

DETAILED DESCRIPTION OF PREFERRED EMBODIMENTS

Figure 1:
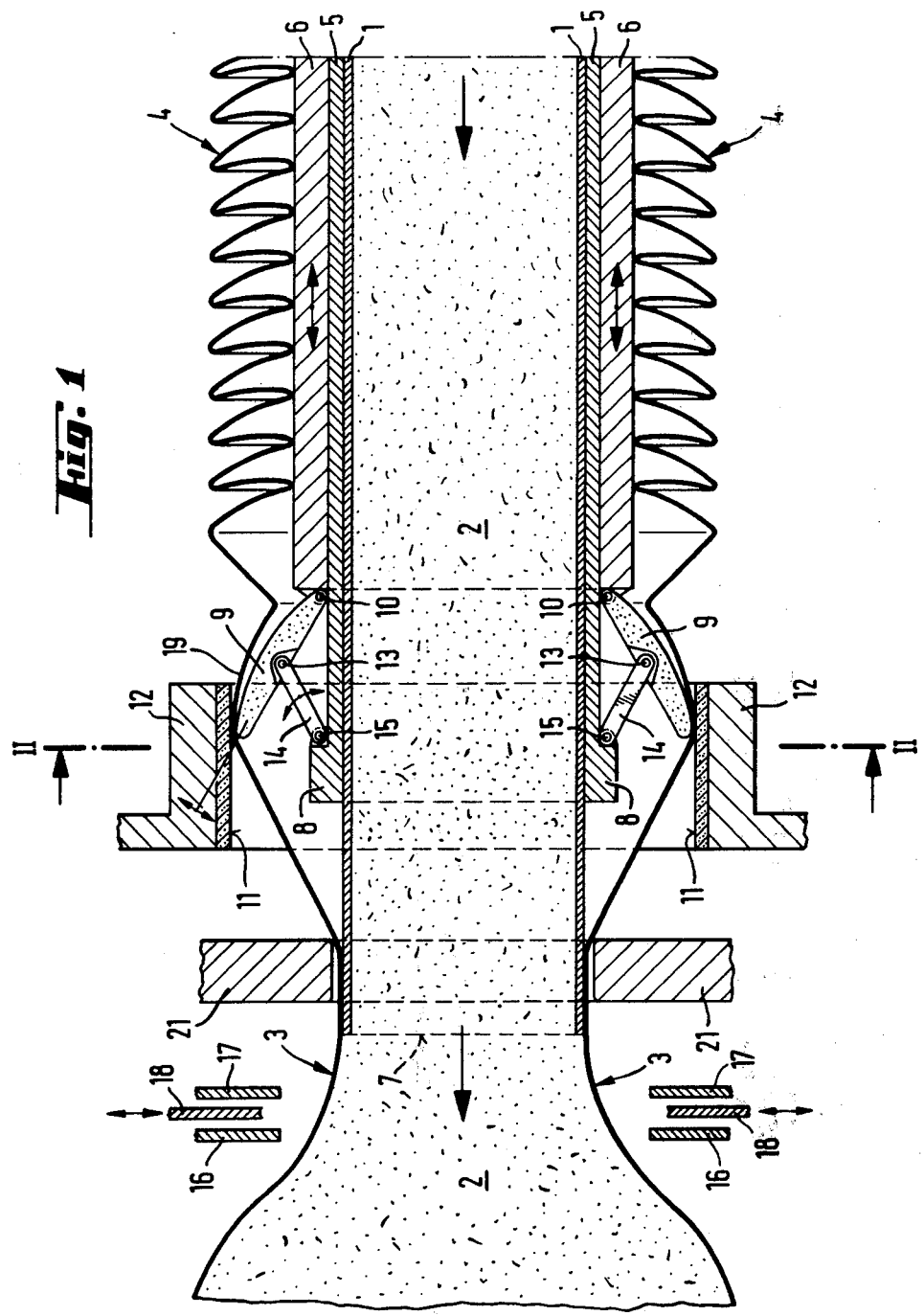
FIG. 1 is a sectional side view of an apparatus equipped with the device of the invention taken along the line I—I of FIG. 2.

The tubular casing is made, for example, from a material customarily used for producing sausages, such as cellulose hydrate, collagen or synthetic intestines, for example of a polyamide or polyester. Optionally, the tubular casing may be fiber reinforced, particularly with a paper insert. The casing may have the usual coatings on its outer and/or inner surfaces, e.g. of a material impermeable to water vapor and oxygen, which may be anchored to the surface of the tubular casing by conventional adhesion-promoting means. When a cellulose hydrate casing is used, it may have the usual water content of from 6 to 15 percent, but it also may have a very high water content of up to approximately 35 percent, so that the casing does not need to be soaked in water prior to stuffing. Cellulose hydrate casings are generally produced by coagulation of viscose and regeneration of the cellulose and contain softeners such as glycerin.

The significant parts of the device of the invention include the smoothing elements, which are disposed on the stuffing horn near the stuffing horn outlet, and the stop cylinder against which the smoothing elements can be pressed. The stuffing machine serves to fill the tubular casings, for example with a sausage mixture. The smoothing elements are preferably relatively rigid and generally are formed of metal.

During the stuffing operation, the position of the stop cylinder is fixed. The stop cylinder may comprise two or more individual segments which together form a ring surrounding the stuffing horn. Spacings may optionally be provided between adjacent individual segments. The form and number of the segments is then adjusted to fit or suit the smoothing elements. The inner surface of the stop, i.e. its cylindrical inner surface, preferably is formed of an elastic material, for example of rubber, and has a smooth surface, so that the tubular casing will not be damaged when pressed thereagainst.

After passing through the stop cylinder, the tubular casing is constricted immediately adjacent the stuffing horn outlet by means of a ring so that the sausage mixture flowing out of the stuffing horn outlet cannot flow back toward the stop cylinder. Known devices for closing or tying off the tubular casing, for example clip devices, and a cutting station for severing the filled and closed segments of the tube follow the stuffing horn outlet.

At the outset of the stuffing operation, the beginning of the deshirred casing is initially drawn over the smoothing elements and closed off in the clip device. In order to make the placement of the shirred casing on the stuffing horn easier, the smoothing elements are pivoted to lie as flat as possible against the stuffing horn, for example by sliding the second outer tube longitudinally in a direction opposite to the stuffing horn outlet, and the stop cylinder is slid longitudinally of the stuffing horn or, if the stop cylinder is comprised of segments, the segments are moved or pivoted away from the stuffing horn.

By means of the pressure with which the paste-like stuffing material, for example a sausage mixture, is pressed through the stuffing tube into the deshirred portion of the tubular casing, the casing is continuously drawn over the outer surface of the smoothing elements, whereby it is simultaneously deshirred and smoothed. As a result of the frictional forces arising from the mutual contact of the stop cylinder, casing and smoothing elements, the withdrawal of the tubular casing is braked. The braking effect is not regulated by the degree of stretching of the tube, but instead by the pressure between the smoothing elements and the stop cylinder, which is adjusted, for example by longitudinal displacement of the second outer tube. Withdrawal speeds customarily lie in the range from 10 to 20 meters per minute.

After the tube is completely filled, the smoothing elements are again positioned flat against the outer surface of the stuffing horn by longitudinal displacement, for example, of the second outer tube in a direction opposite the stuffing tube opening. The stop cylinder is at least partially removed, for example, by pivoting away the segments of the stop cylinder or by sliding the stop cylinder parallel to the longitudinal axis of the stuffing horn. Thereafter, the next shirred casing can be placed on the stuffing horn.

The longitudinal displacement, for example of the second outer tube, may be effected manually or by means of mechanical, hydraulic or pneumatic devices.

Turning now to the drawings, the apparatus of FIG. 1 comprises the stuffing horn 1 of a stuffing device through which a fluid mass 2 flows under pressure into the deshirred portion 3 of the tubular casing. The shirred portion 4 of the tubular casing is disposed on the second outer tube 6 which is arranged on the first outer tube 5 so as to be longitudinally displaceable and lockable in position. The first outer tube 5 is releasably secured to a machine stand (not shown) and ends in an enlarged portion or ridge 8 near the stuffing horn outlet 7. The smoothing elements 9 are pivotably secured at one of their ends by pivotable mounts 10 to the end of the second outer tube, while the other ends of the smoothing elements press the tubular casing against the cylindrical inner surface 11 of the stop cylinder 12 which serves as a braking element. The smoothing elements 9 are further attached by pivotable joints 13 to connecting arms 14 which in turn are attached to a supporting mount 15 adjacent ridge 8 on the first outer tube 5. Reference numerals 16 and 17 designate schematically represented clip devices for closing the sausage casings, and reference numeral 18 designates a cutting device.

A known device for preventing backflow of the fluid mass in a direction opposite to the direction of movement of the tube is attached adjacent the stuffing horn outlet 7. It takes the form of a ring 21 which constricts the tube against the stuffing horn.

Figure 2:
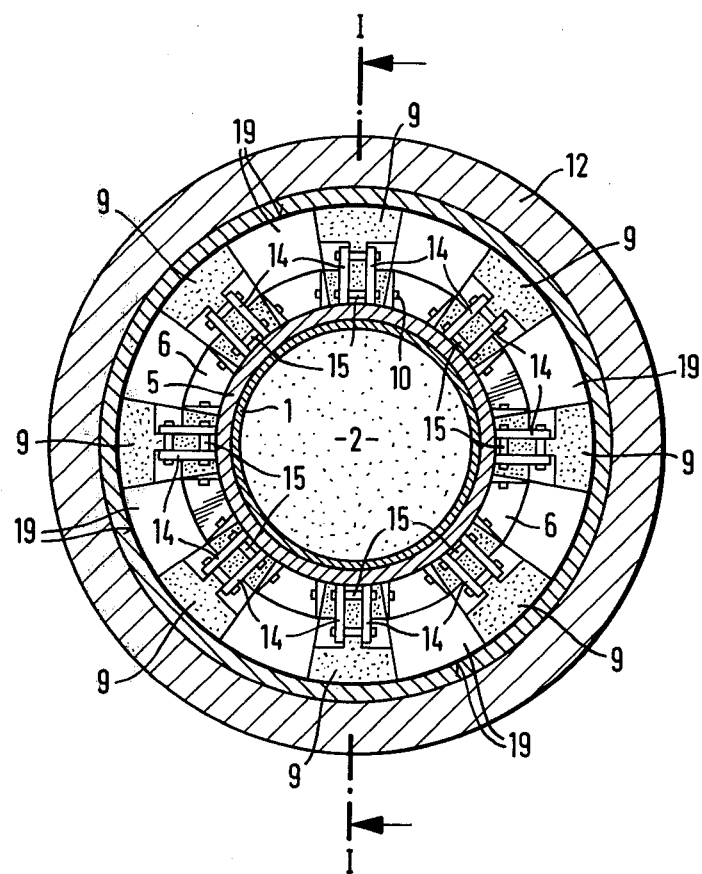
FIG. 2 is a sectional view of the apparatus of FIG. 1 taken along the line II—II of FIG. 1.

In FIGS. 1 and 2, the portion of the tubular casing from its entry into the contact zone between the smoothing elements 9 and the cylindrical inner surface 11 is designated by reference numeral 19. The alternative embodiment which is shown in cross section in FIG. 3 has an auxiliary or supplementary covering or bellows 20 which, upon spreading of the elements 9, is pressed against the cylindrical inner surface 11 of the stop cylinder 12. Covering 20 is attached at the ridge 8 of the first outer tube 5 and at the end of the second outer tube 6.

Figure 3:
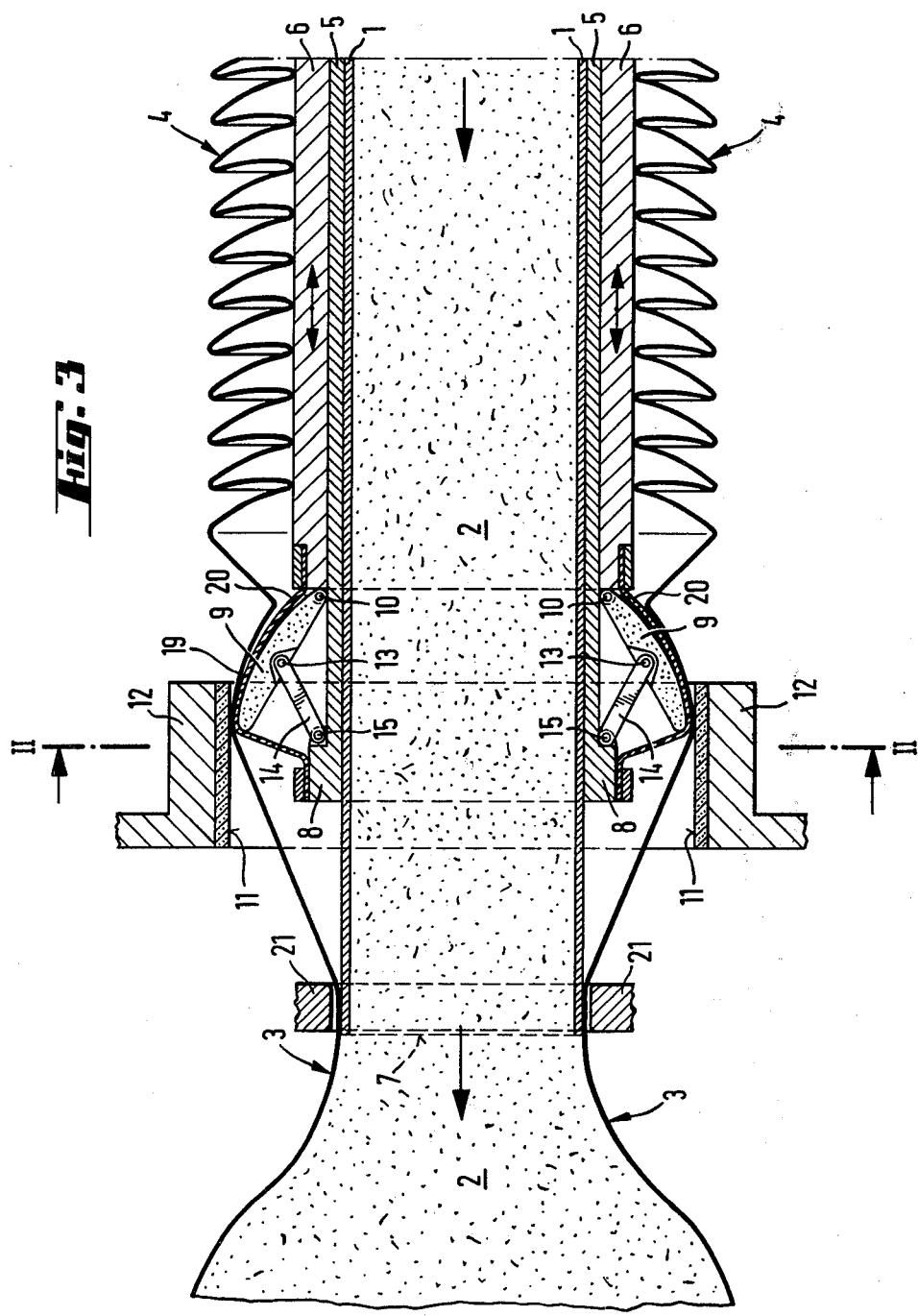
FIG. 3 is a sectional side view of an apparatus equipped with an alternate embodiment of the device of the invention.

The clipping devices 16 and 17 and the cutting device 18 are not shown in FIG. 3.

The apparatus of the invention has the advantage that the shirred tubular casing 4 is already in a largely deshirred and creaseless condition 19 as it enters the friction area so that a jerkless withdrawal of the tubular casing is assured during the stuffing operation, and the danger of tearing the casing is greatly reduced. By varying the pressure of the smoothing elements 9 against the stop cylinder 12, the stuffed diameter of the sausage can even be adjusted, corrected or controlled during the stuffing process.

The foregoing description has been set forth merely to illustrate the invention and is not intended to be limiting. Since modifications of the disclosed embodiments incorporating the spirit and substance of the invention may occur to persons skilled in the art, the scope of the invention is to be limited solely with respect to the appended claims and equivalents.

What is claimed is:

1. A device for deshirring, smoothing and braking a shirred tubular casing during the stuffing of the tubular casing with a fluid mass which flows under pressure out of the stuffing horn of a stuffing machine into the tubular casing, said device comprising first and second outer tubes arranged coaxially over each other on the stuffing horn whereby the innermost, first outer tube surrounds the stuffing horn, one of said outer tubes being fixed in position and the other outer tube being longitudinally displaceable and lockable into position, said device further comprising elements which deshirr, smooth ahd brake the tubular casing during the stuffing operation comprising pivotable bodies with smooth surfaces which are pivotably fastened at one of their ends by pivotable mounts to the end of one of said outer tubes and further are pivotably attached by pivotable joints to a connecting arm which in turn is pivotably fastened to a supporting mount at the end of the other outer tube, and a fixed stop cylinder having a substantially annular cross-sectional configuration surrounding said elements and spaced therefrom.

2. A system comprising a device for deshirring, smoothing and braking a shirred tubular casing during the stuffing of the tubular casing with a fluid mass which flows under pressure out of the stuffing horn of a stuffing machine into the tubular casing, said system comprising a stuffing horn, a shirred tubular casing disposed on the outer surface of the stuffing horn, said tubular casing having a deshirred portion with a prescribed outer diameter, a first outer tube surrounding the outer surface of the stuffing horn and ending adjacent the stuffing horn outlet, a second outer tube disposed on the first outer tube, a plurality of elements for deshirring, smoothing and braking the movement of the tubular casing, one end of said elements being pivotably fastened to pivotable mounts on the end of one of said outer tubes which is adjacent the end of the other outer tube, said elements further being pivotably attached by pivotable joints to a connecting arm, and said connecting arm being pivotably fastened to a supporting mount at the end of the other outer tube; said first and second outer tubes being longitudinally displaceable with respect to each other to pivot said elements toward or away from the stuffing horn; a fixed stop cylinder having a substantially annular cross-sectional configuration spaced from and coaxially surrounding said stuffing horn and said elements; the shirred portion of said tubular casing being disposed over said second outer tube and the unshirred portion of said tubular casing extending over said elements, whereby said elements may be caused to press the deshirred portion of the tubular casing with increased pressure against the cylindrical inner surface of the stop cylinder by displacing the second outer tube toward the stuffing horn outlet or by displacing the first outer tube in the direction opposite to the stuffing horn outlet.

3. A system according to claim 2, further comprising means for preventing backflow of the material issuing from the stuffing horn outlet in a direction opposite to the direction of movement of the tube.

4. A system according to claim 3, wherein said backflow preventing means comprise a ring constricting the deshirred portion of the tubular casing adjacent the stuffing horn outlet.

5. A system according to claim 2, further comprising means for closing the stuffed tubular casing and means for cutting the closed stuffed tubular casing.

6. A system according to claim 2, wherein the diameter of the central opening of the stop cylinder is smaller than the prescribed outer diameter of the deshirred portion of the tubular casing.

7. A system according to claim 2, further comprising a flexible covering surrounding said elements, one end of said covering being secured to said first outer tube and the other end of said covering being secured to said second outer tube.

* * * * *